INVENTORS
HENRICUS P.C. DANIELS
THEODOOR P.J. BOTDEN
BY
AGENT 3,430,331
APPARATUS AND PROCESS FOR ULTRASONICALLY WELDING A WIRE TO THE SURFACE OF AN OBJECT
Henricus Petrus Cornelis Daniels and Theodor Peter Johannes Botden, Emmasingel, Eindhoven, Netherlands, assignors to North American Philips Company, Inc., New York, N.Y., a corporation of Delaware
Filed Sept. 8, 1964, Ser. No. 394,837
Claims priority, application Netherlands, Sept. 30, 1963, 298,591/63
U.S. Cl. 29—470.3    13 Claims
Int. Cl. B23k 27/00

ABSTRACT OF THE DISCLOSURE

A method of, and apparatus for, welding a first wire-shaped body perpendicular to a planar surface of a second body by means of ultrasonic vibrations. The wire-shaped body is fixed within a bore in an anvil with one end exposed. The planar surface of the second body contacts the exposed end and is caused to vibrate in a direction parallel to the contact face by means of an ultrasonically vibrating element having a welding tip which is free to glide across the second body upon formation of the weld.

---

Figure 1:
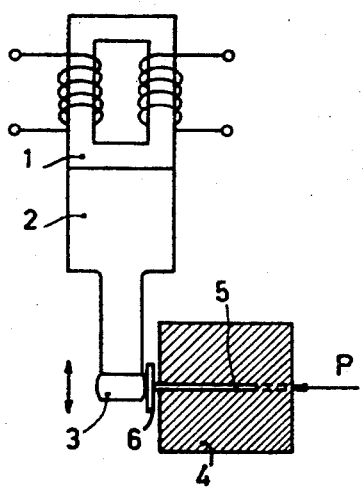

This invention relates to a method of welding a wire-shaped body to the surface of a second body, e.g. a plate-shaped body, by ultrasonic means, and to a device for carrying out said method. It is common practice to produce a spark discharge between the head surface of the wire, i.e. in the plane of intersection with the centre line, and the second body, so that a so-called stud weld is obtained. If the thickness of the two bodies is sufficiently great, this method does not give rise to insuperable difficulties. However, if the thickness of the second body is small, e.g. a fraction of a millimetre, the electric arc may quickly burn through the second body. Also in the case of very thin wires, the tip of the wire may burn off before the weld has been formed.

In order to avoid these drawbacks, efforts have been made to supply just the required quantity of energy to the weld by means of very accurately dosed current pulses so as to prevent the type of damage referred to above. However, this method is far from being suitable in all cases. For example, if materials such as copper, aluminum or brass have to be welded, the latter method can be carried out only with great difficulty.

The invention relates to a method in which the weld is made by means of ultrasonic oscillations. It is known that a weld can be formed by supplying ultrasonic oscillations of adequate energy to the contact surface of two work pieces. If desired, an additional amount of electrical energy, for example, an electric current, may be supplied to the welding area, but this is not always required in order to establish a satisfactory weld.

Experiments underlying the invention have shown that the solution of the problem concerned requires some further measures. It was found, for example, that when the wire was caused to oscillate in an axial direction at right angles to the surface of the second body, it pierced the second body before a weld could be established. Experiments in which the wire was caused to oscillate parallel to the surface of the second body also yielded poor results, since the weld, if it was formed at all, broke down readily.

A characteristic feature of the invention that the wire is arranged in an aperture of the anvil of an ultrasonic welding device and that the welding nozzle of the ultrasonic welding device urges the second body against the head face of the wire-shaped body with such a force that this second body is caused to perform, parallel to its surface, such strong ultrasonic oscillations that the weld is formed, after which the welding nozzle can slide along the surface of the second body.

The invention is based on the recognition of the fact that the poor results of the aforesaid welding method, in which the wire is caused to vibrate parallel to the surface of the second body, are due to the vibration itself impeding the formation of a satisfactory weld. In order to cause the wire in the known method to vibrate, it must be passed through a bore in the welding nozzle. In this case, the bore is so narrow that the wire must follow the motions of the welding nozzle to a sufficient extent. Therefore, the head face of the wire rubs the surface of the second body and as soon as a weld tends to be formed, it is disrupted by the mutual vibrations of the two bodies. However, in the method according to the invention, the ultrasonic vibration is propagated through the second body up to the contact area of the two bodies, so that a weld can be formed. As soon as a weld has been formed, the welding nozzle can slide along the surface of the second body so that the vibrations will not disengage the weld formed.

Figure 2:
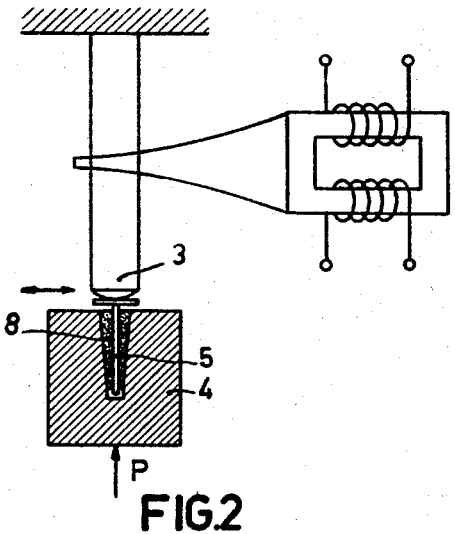
Figure 3:
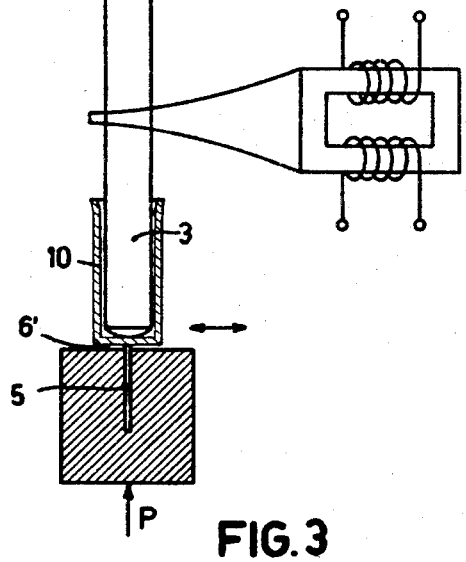

The invention will be described with reference to the drawing, in which:

FIGURE 1 shows a first embodiment of the invention,
FIGURE 2 shows a second embodiment thereof, and
FIGURE 3 shows a third embodiment of the invention.

The device shown in FIGURE 1 comprises a transducer 1 for converting electric oscillations into ultrasonic vibrations. The transducer is connected through an amplitude transformer 2 to a welding nozzle 3. The welding nozzle 3 is caused to vibrate in the direction indicated by the arrows. Opposite the welding nozzle 3, there is arranged an anvil 4, which is provided with a bore for receiving the wire-shaped body 5. The anvil 4 may be shaped in the form of a claw head in which the wire-shaped body 5 is clamped tight. It may also be formed as a solid body in which, at least in the close proximity of the anvil surface facing the welding nozzle 3, the wire-shaped body 5 fits intimately in the bore of the anvil 4. If it is so desired, the bore may extend up to the opposite surface of the anvil 4, as is indicated in broken lines, so that the wire can be supplied continuously. The wire 5 preferably projects from the surface of the anvil 4 facing the welding nozzle 3 over a distance smaller than the diameter of the wire. In this case the projecting wire end is sufficiently rigid so that it can resist the ultrasonic oscillations.

A second, for example, plate-shaped body 6, is arranged between the welding nozzle 3 and the wire-shaped body 5. By pressing the wire 5 and the anvil 4 in the direction of the arrow P against the plate-shaped body 6 and the welding nozzle 3, the head surface of the wire-shaped body 5 can be welded to the surface of the second body 6, so that a butt weld is formed. The pressure P is adjusted so that initially the ultrasonic vibration of the welding nozzle 3 can propagate through the plate-shaped body 6 up to the contact area of the plate-shaped body 6 and the wire-shaped body 5 where a weld is formed. However, once the weld is formed it resists the ultrasonic vibration to an extent such that the welding nozzle 3 can glide along the surface of the plate-shaped body 6. This effect may be furthered when the supplied energy develops an amount of heat such that, at the instant of formation of the weld, the end of the wire 5 is slightly swaged so that the contact surface between the head end of the wire 5 and the surface of the plate 6 is enlarged.

In practice, it was found to be possible to weld, for example, copper or aluminium wires of a diameter of 1 mm. or less in this manner to copper, brass or aluminium plates of thicknesses varying between 500μ and 25μ. The wire head could be swaged with an enlargement of about 50%, but satisfactory welds could also be obtained in which the wire had not been swaged at all.

With an operational frequency of 20 kHz. and a power of 80 to 150 watts a pressure P of 5 to 20 kgs. was employed. The welding time amounted to a fraction of a second.

In the device shown in FIG. 2, the anvil 4 is provided with a conical aperture holding a fitting filling piece 8, which consists of a number of segments, for example, three. A central bore in the filling piece 8 accommodates the wire-shaped body 5. The segments, at least the ends facing the welding nozzle 3, are movable in a radial direction so that they embrace the wire 5 like a claw. The gripping action is increased as the anvil 4 is urged more strongly by the force P. Thus, during the welding operation, the wire 5 is substantially immovable, whereas afterwards it can be easily removed from the anvil 4.

In the device shown in FIGURE 3, the method according to the invention is employed for stud welding a wire 5 to the bottom 6' of a box-shaped body 10, for example, the box-shaped envelope of an electrolytic capacitor. The box 10 is slipped onto the welding nozzle 3 of the ultrasonic oscillator so that the bottom plate 6' is caused to vibrate in the direction of the arrows parallel to its surface. The wire 5 is again urged with the required pressure P against said bottom plate so that a weld can be formed. The space between the side walls of box 10 and the welding nozzle 3 is sufficiently large so that, as soon as the weld is formed, the nozzle 3 can glide along the surface of the bottom plate 6'.

The method described above also may be employed for stud welding to arbitrarily shaped surfaces, for example, to a lug or a protuberance of the second body. It is also possible to weld wires at a given angle to said surfaces provided that the contact areas of the two bodies, where the weld is to be formed, are not at an excessively large angle to each other.

What is claimed is:

1. A method for welding a first wire-shaped body to a planar surface of a second body comprising, placing said first body substantially perpendicular to the planar surface of said second body so that the end face of said first body contacts said planar surface, applying a force to the bodies in a direction substantially parallel to the longitudinal axis of said first body and of a magnitude to hold the contacting faces of said bodies together at the intended weld zone, and introducing mechanical vibrations to said weld zone by means of a vibrating element having a component of vibration in a direction parallel to the contact face of said second body and having a welding tip which contacts said second body, said force having a magnitude sufficient to cause said second body to vibrate in a direction parallel to its contact face at an energy level sufficient to form a weld whereupon the welding tip will then glide along the surface of said second body.

2. A method for welding a first wire-shaped body to the surface of a second body comprising, fixing said first body within a bore in an anvil so that an end of said first body is exposed, holding said second body in contact with the exposed end of said first body between said anvil and the welding tip of a vibrating element thereby to form a weld zone between the end face of said first body and a face of said second body, applying a force to said first and second bodies in a direction to hold the bodies in contact while vibrating said welding tip so as to cause said second body to vibrate parallel to its contact face at an energy level sufficient to form a weld whereupon the welding tip will then glide along the surface of said second body.

3. A method in accordance with claim 2 wherein the distance said exposed end of said first body extends beyond the surface of said anvil is less than the diameter of said first body.

4. A method of welding a first wire-shaped body to one face of a second plate-shaped body comprising, rigidly fixing said first body within a bore in an anvil so that one end of said first body is exposed, holding said second body in contact with the exposed end of said first body between said anvil and the welding tip of an ultrasonically vibrating element so as to form a weld zone between the end face of said first body and said one face of the second body, applying a force to said first and second bodies along the longitudinal axis of said first body in a direction to hold the bodies in contact while vibrating said welding tip in a direction to cause said second body to vibrate parallel to its contact face at an energy level sufficient to form a weld and thereafter allow the welding tip to glide back and forth along the other face of said second body.

5. A method in accordance with claim 4 wherein sufficient energy is supplied to said weld zone by said vibrating element to cause said first body to move towards said plate-shaped body when the weld is being formed.

6. A method for welding a first thin elongated body to the face of a second relatively thin plate-shaped body comprising, positioning said first body within an aperture in an anvil, holding the end face of said first body in contact with said face of said second body between the welding tip of a vibrating element and said anvil thereby to form a weld zone at the contact faces of said first and second bodies, applying a force to said first and second bodies in a direction to hold the bodies in contact while vibrating said welding tip so as to cause said second body to vibrate parallel to its contact face at an energy level sufficient to form a weld between said bodies, after which the welding tip can glide along the face of said second body.

7. Apparatus for butt welding an end face of a first wire-shaped body to a flat surface of a second body comprising, an anvil having an aperture therein for holding said first body so that said end face is exposed, a vibrating element having a welding tip opposite said aperture for contacting said second body and sandwiching said exposed end of said first body and said second body between said anvil and said welding tip, force applying means for urging said first and second bodies together to form a weld zone, said force applying means and said vibrating element cooperating to produce vibration of said second body in a direction parallel to its contact face and at an energy level sufficient to form a weld between said bodies, the magnitude of the urging force being such as to allow said welding tip to glide along the surface of said second body upon formation of the weld.

8. Apparatus as described in claim 7 wherein said aperture is in the shape of a cone and further comprising a conically-shaped gripping member positioned within said aperture to grip said wire-shaped body.

9. Apparatus as described in claim 7 wherein that portion of the anvil holding said wire-shaped body has the shape of a claw head.

10. Apparatus as described in claim 7 wherein said wire-shaped body is arranged so that its longitudinal axis is substantially perpendicular to said flat surface of said second body.

11. Apparatus as described in claim 7 wherein said wire-shaped body is positioned within said aperture so that said exposed end projects beyond the end of said aperture for a distance which is less than the diameter of said wire-shaped body.

12. A method of welding a first relatively thin wire-shaped body to the surface of a sheet-like part of a second body comprising, placing the end face of said first body and a face of said part of said second body together so that the longitudinal axis of said first body is substantially perpendicular to said second body face part, supporting said wire-shaped body about a portion of its longitudinal axis to limit flexure thereof, applying a force to the bodies in a direction and of a magnitude to hold the contacting faces of said bodies together at the intended weld zone, and introducing mechanical vibrations to said weld zone through a vibrating element having a component of vibration in a direction parallel to the contact face of said second body and having a welding tip which contacts the opposite face of said part of said second body, the magnitude of said force being sufficient to impart vibration to said second body in a direction parallel to its contact face and the energy supplied to said weld zone by said vibrating element being of a level sufficient to cause said first and second bodies to move together at the instant the weld is formed thereby to increase the weld zone contact area between said first and second bodies, after which the welding tip is free to oscillate across the surface of said part of the second body.

13. Apparatus for welding an end face of a first wire-shaped body to one face of a second plate-shaped body comprising, an anvil having an aperture therein for holding said first body so that said end face is exposed, a vibratory element having a welding tip opposite said aperture for contacting said second body and sandwiching said exposed end of said first body and said second body between said anvil and said welding tip, force applying means for urging said first and second bodies together to form a weld zone, means for vibrating said vibratory element so as to cause said welding tip to vibrate in a direction parallel to said one face of the second body, said force applying means and said vibrating means cooperating to produce vibration of said second body in a direction parallel to its contact face and at an energy level sufficient to form a weld between said bodies and thereafter allow said welding tip to glide along the opposite face of said second body.

References Cited

UNITED STATES PATENTS 3,052,020    9/1962    Jones et al. _____ 29—497.5

RICHARD H. EANES, *Primary Examiner.*

U.S. Cl. X.R.

228—2